United States Patent [19]

Meier

[11] Patent Number: 4,519,272
[45] Date of Patent: May 28, 1985

[54] TRANSMISSION HAVING A CONSTANT TORQUE RATIO OUTPUT AT A VARIABLE SPEED RATIO OUTPUT

[75] Inventor: Bruno Meier, Winterthur, Switzerland

[73] Assignee: Sulzer Brothers Limited, Winterthur, Switzerland

[21] Appl. No.: 390,947

[22] Filed: Jun. 22, 1982

[30] Foreign Application Priority Data

Jul. 15, 1981 [CH] Switzerland ............... 4634/81

[51] Int. Cl.³ .................. F16H 3/74; B61C 11/00
[52] U.S. Cl. .................. 74/752 R; 74/752 C; 74/752 D; 74/752 A; 74/785; 125/73; 125/97
[58] Field of Search ............ 74/687, 688, 752 R, 74/752 A, 752 C, 752 E, 785, 786; 105/82, 97, 73, 96, 108, 127, 130

[56] References Cited

U.S. PATENT DOCUMENTS

| | | | |
|---|---|---|---|
| 841,588 | 1/1907 | Shipman | 105/73 |
| 2,092,381 | 9/1937 | Stewart | 105/73 |
| 2,170,766 | 8/1939 | Rieger | 105/73 X |
| 2,321,059 | 6/1943 | Anderson | 105/73 X |
| 2,332,584 | 10/1943 | McCune | 105/73 X |
| 2,939,343 | 6/1960 | Berklege | 74/785 X |
| 4,067,260 | 1/1978 | Finsterwald | 105/108 X |
| 4,311,066 | 1/1982 | Schuhmann | 74/752 C X |

FOREIGN PATENT DOCUMENTS 2940550  4/1981  Fed. Rep. of Germany .

Primary Examiner—Allan D. Herrmann
Assistant Examiner—Joseph M. Rolnicki
Attorney, Agent, or Firm—Kenyon & Kenyon

[57] ABSTRACT

The transmission has a power division transmission which is adapted to provide a variable speed division with a constant torque division. The power division transmission has three branches comprising a motor input shaft and two branched transmissions. Each branched transmission is associated with a separate output shaft. At least one further power division or differential transmission is associated with the branched transmissions and the input shaft and has a rotatable transmission part. This latter part is connected to a speed control means such that the degree of slip between the branched transmission output shafts can be varied and/or controlled.

18 Claims, 5 Drawing Figures

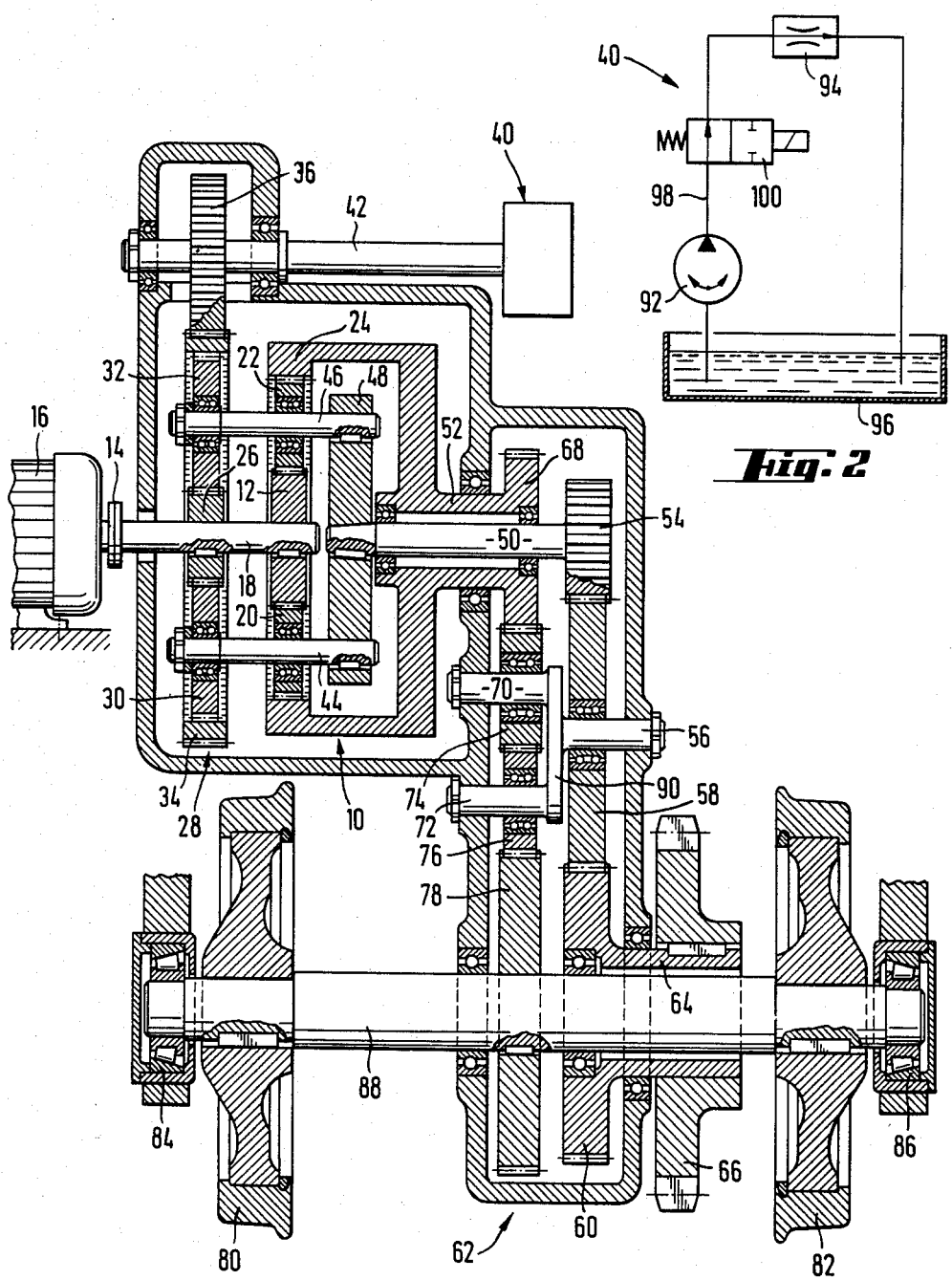

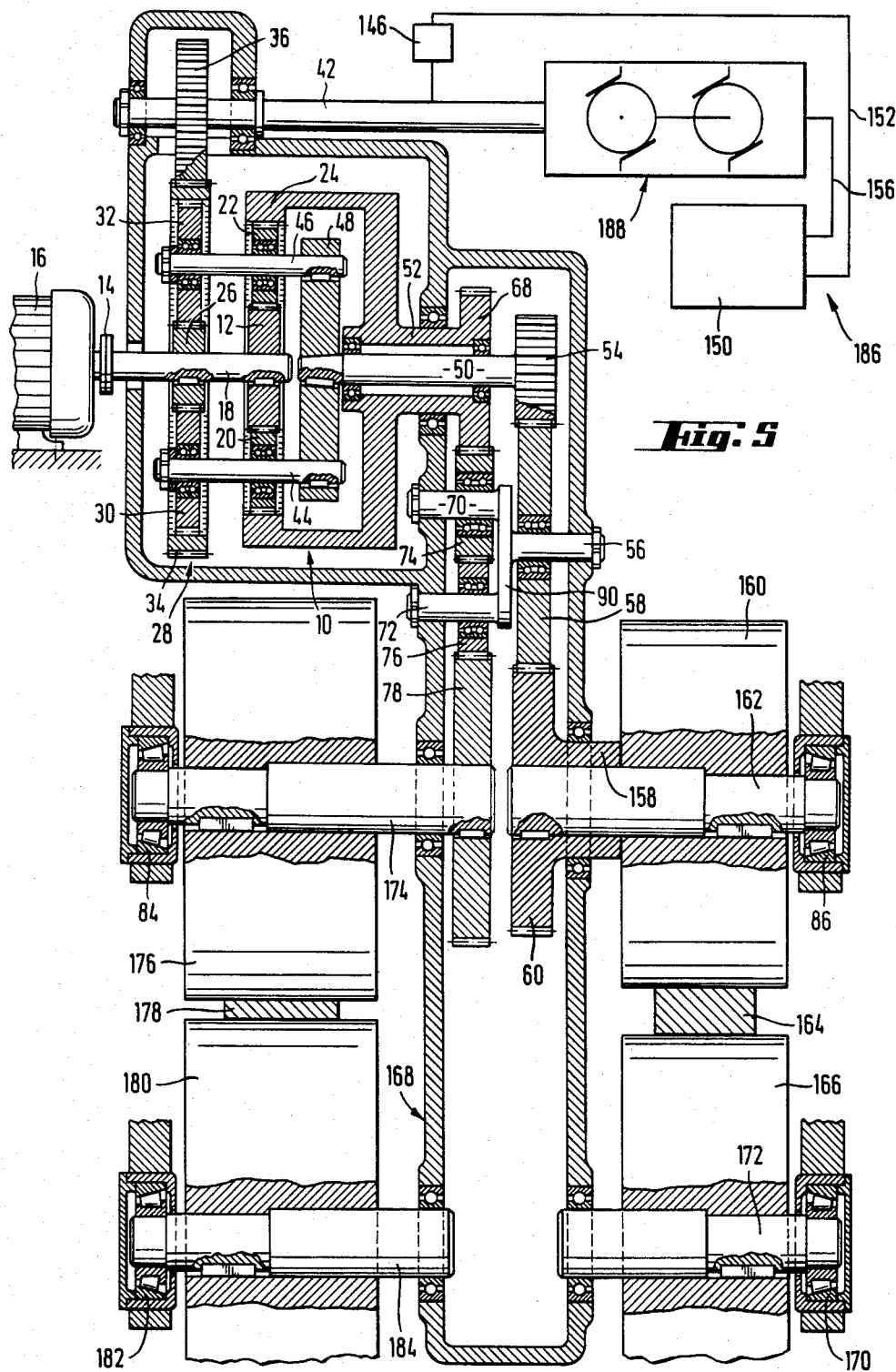

TRANSMISSION HAVING A CONSTANT TORQUE RATIO OUTPUT AT A VARIABLE SPEED RATIO OUTPUT

This invention relates to a transmission having a constant torque ratio output at a variable speed ratio output.

As is known, various types of transmission have been constructed in order to drive two or more elements in various relationships to each other. For example, rail power vehicles adapted for rack and adhesion operation or for adhesion operation alone have been provided with transmissions which can deliver power through separate branch lines to adhesion wheels and to a rack gear. Similar drives have also been used in conveyors and the like in which two output wheels or rolls are required to be run with a variable difference in the peripheral velocities, i.e. slip.

As described in German O.S. No. 2 940 550 (corresponding to U.S. patent application Ser. No. 193,738, filed Oct. 3, 1980—now abandoned), one known drive for a rail power vehicle includes at least one rotation-inhibiting means in a drive line between a drive gear and an adhesion wheel. Normally, the adhesion wheel runs at the same peripheral velocity as the drive gear, at least in a coaxial arrangement, but at fewer revolutions per unit of time than the drive gear. The rotation-inhibiting facility permits the adhesion wheel, for instance, on traction, to increase its peripheral velocity relative to the drive gear until the two speeds per unit of time are equal at a particular place in the drive or one speed per unit of time is zero, i.e. in both cases, the normal difference between the speeds of revolution at such place in the drive drops to zero. Once the zero value has been reached, the rotation inhibiting facility operates to prevent any further variation of the difference in the rotational speeds. The adhesion wheel is then coupled rigidly or positively to the drive gear by way of the rotation-inhibiting facility and has a predetermined maximum slip relative to the drive gear.

Once normal friction conditions are again operative between the adhesion wheel and the rail, the rotation-inhibiting means permits a fully automatic restoration of the previous difference between the revolutions per unit of time at the particular place in the transmission concerned. The converse applies during braking. In this latter case, the rotation-inhibiting facility is so directed that the peripheral velocity of the adhesion wheel can be reduced relative to that of the drive gear.

However, this known drive has the disadvantage that separate rotation-inhibiting facilities must be provided for traction and braking. Further, provision must be made to change over the rotation-inhibiting facilities when the direction of travel reverses. Also, very elaborate steps must be taken in order to vary the speed range of the rotation-inhibiting facility, for example to optimize maximum slip.

Accordingly, it is an object of the invention to provide a transmission of relatively simple and compact construction for coordinating the slip between two driven members.

It is another object of the invention to provide an optimum slip irrespective of the kind of operation between two rotatable members which are driven from the same transmission.

It is another object of the invention to provide a transmission for a rail power vehicle of the rack type which provides optimum slip irrespective of whether the form of operation is traction or braking and irrespective of the direction of travel of the vehicle.

It is another object of the invention to provide a transmission which is able to achieve optimum slip in a conveyor irrespective of the conveying direction.

Briefly, the invention provides a transmission which may be used in a rail power vehicle adapted for rack or adhesion operation at will or for adhesion operation alone. The transmission is also suitable for driving conveyor rollers.

The transmission includes a power division transmission having a power input shaft and a pair of branched transmissions connected with the input shaft, to deliver a constant torque ratio output at a variable speed ratio output. In accordance with the invention, a differential transmission is connected with each branched transmission or with one of said branched transmissions and the power input shaft and has a rotatable transmission part for rotation in response to a slip between the branched transmissions. In addition, a speed control means is connected to the rotatable transmission part for limiting the speed of the part in order to limit the slip between the branched transmissions.

The construction of the transmission is such that only one particular positive or negative or zero speed per unit of time (e.g. revolutions per minute) of the rotatable transmission part need correspond to a particular optimum slip between the branched transmissions.

The speed control means may be in the form of a speed limiter or a speed controller which prevents an overshoot or undershoot of the particular speed per unit of time and, therefore, of the permissible slip. The speed control means also allows a variation of the permissible range over which the slip is free to vary during operation of the drive. Consequently, the permissible range of slip can be varied continuously in light of the varying rail or road friction conditions as well as the friction conditions of materials being conveyed or of rollers or the like.

In addition to the speed control means, the transmission may be provided with a braking means (i.e. a rotation-inhibitor facility) for selectively braking the rotatable transmission part. Consequently, in the case of a rail power vehicle, unnecessary driving of a driving gear during adhesion operation over a rackless section of rail line can be avoided by using the braking means in known manner.

In one embodiment, the speed control means includes an oil pump for circulating a flow of oil in a closed circuit in response to rotation of the rotatable rotation part and a flow control valve for limiting the flow of oil in the circuit. In this case, no separate braking means is needed since the oil pump can be locked in known manner by means of a diverter.

In another embodiment, the speed control means may include a generator which is coupled to the rotatable transmission part and an accumulator which is connected to the generator in order to receive a voltage surge in response to the transmission part reaching a predetermined speed. The advantage of this feature is that the energy arising from braking can be recovered electrically and, for example stored.

In still another embodiment, the speed control means may be an electrical motor-generator unit which is capable of being operated in a motor mode or a generator mode. Such an electric machine can prevent the slip from undershooting a particular value, that is, if the speed per unit of time of the rotating transmission part drops below a critical value, an opposing torque can be produced by changing over to the motor mode.

In still other embodiments, the speed control means may be in the form of a hydrodynamic brake or a centrifugal brake. In such cases the control means can be very compact.

The speed control means may also include a speed senser for sensing the speed of the rotatable transmission part and for emitting a signal in response thereto. In addition, a control facility is connected between and to the senser and the braking means for receiving the signal and for selectively actuating the braking means in response to the signal. This presents the advantageous feature of great flexibility as a desired maximum or minimum range of slip can be set up. Further, the control facility can be adapted to store various speed ranges for the particular rotatable transmission part concerned; such ranges serving to operate a brake and/or motor. The range of slip can then be adapted to different operating conditions such as a change in diameter of the wheels or rolls or the like.

These and other objects and advantages of the invention will become more apparent from the following detailed description taken in conjunction with the accompanying drawings wherein:

FIG. 1 illustrates a longitudinal sectional view of a transmission constructed in accordance with the invention for a rail vehicle adapted for rack and/or adhesion operation at will;

FIG. 2 illustrates a detailed view of a speed control means used in the transmission of FIG. 1;

FIG. 5 illustrates a longitudinal sectional view of a further embodiment of a transmission according to the invention for use with a tandem rolling mill.

Figure 3:
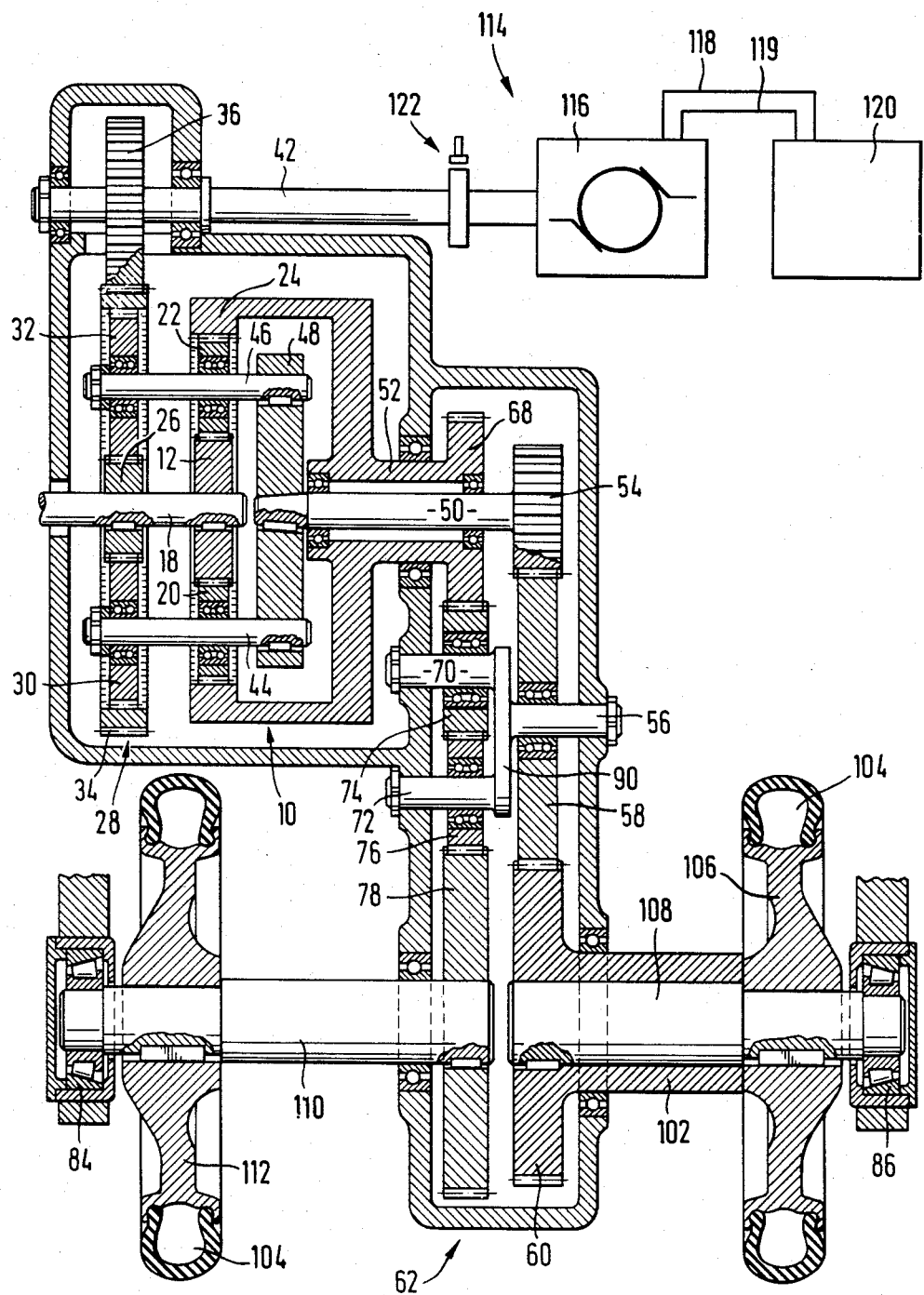
FIG. 3 illustrates a longitudinal sectional view of a modified transmission constructed in accordance with the invention for a tired vehicle.

Referring to FIG. 1, the transmission includes a power division transmission 10 of planetary type which is housed in a casing 62. The transmission 10 has a sun gear 12 mounted on a power input shaft 18 for rotation therewith. As indicated, the input shaft 18 is coupled via a coupling 14 with a driving motor 16. In addition, a pair of branched transmissions are connected with the input shaft 18.

One branched transmission includes an internally toothed annulus 24 which is disposed about the sun gear 12 and a pair of planetary gears 20, 22 which are in meshing engagement with the sun gear 12 and the annulus 24. The annulus 24 includes a hollow shaft section 52 which carries a pinion 68 at one end. The pinion 68, in turn, cooperates via two gears 74, 76 which are mounted on journals 70, 72 in the casing 62 with a gear 78 which is connected for co-rotation to a drive or output shaft 88. As shown, the output shaft 88 carries a pair of adhesion wheels 80, 82 which are mounted in bearings 84, 86, for example in a rail vehicle frame.

The second branched transmission has a shaft 50 which is connected with the planetary gears 20, 22 via a web 48 and a pair of shafts 44, 46 on which the planetary gears 20, 22 are respectively mounted. In addition, the shaft 50 is mounted within the hollow shaft section 52 of the annulus 24 and carries a pinion 54 at one end.

The pinion 54 cooperates via a gear 58 mounted on a journal 56 in the casing 62 with a gear 60 which is mounted concentrically of the shaft 88. As shown, the gear 60 has a hollow shaft portion or hub 64 which passes through and is journalled in the casing 62. The outer end of the hub 64 carries a drive gear 66 for co-rotation.

The transmission also includes a differential transmission 28. This differential transmission 28 includes a second sun gear 26 which is mounted on the input shaft 18 for rotation therewith and an internally toothed annulus 34 which is disposed coaxially of the sun gear 26. In addition, a pair of planetary gears 30, 32 are in meshing engagement between and with the sun gear 26 and the annulus 34 while being rotatably mounted on the respective shafts 44, 46 in common with the planetary gears 20, 22. In this way, the planetary gears 30, 32 are mounted in common with the shaft 50. As shown, the differential transmission 28 also has a rotatable transmission part, for example, a shaft 42, which is connected with the annulus 34 via a meshing pinion 36.

The transmission also includes a speed control means 40 which is connected to the shaft 42 for limiting the speed of the shaft 42 in order to limit the slip between the branched transmissions.

As indicated in FIG. 1, the casing 62 houses most of the components of the transmission with the drive shaft 88, the drive gear 66 and the shaft 42 extending therefrom.

In addition, the respective journals 56, 70, 72 are fixedly mounted in the casing 62 and are connected to each other via a common web 90.

Referring to FIG. 2, the speed control means 40 includes an oil pump 92 for circulating a flow of oil in a closed circuit in response to rotation of the shaft 42 and a flow control valve 94 for limiting the flow of oil in the circuit. As indicated, the circuit includes a sump 96 for the oil. The pump 92 is capable of delivering an output in a single direction for both directions of rotation. In addition, the pump is connected via a line 98 to a two-way diverter 100. Of note, the symbols in FIG. 2 are in accordance with 1219-1976 E/F of the International Organization for Standardization (ISO).

As an example of how the drive operates, it is assumed that the transmission ratios are such that at a motor speed of 3,000 rpm, the drive gear 66 runs at 298 rpm and the adhesion wheels 80, 82 at 265 rpm. The adhesion wheels 80, 82 have a diameter of 1,000 millimeters and the drive gear 66 has a diameter of 890 millimeters. Thus, the peripheral speeds are equal and correspond to a speed of travel of 50 kilometers per hour.

The tooth numbers of the sun gears 12, 26 are 81 and 54, respectively; of the planetary gears 22, 32 are 18 and 45 respectively; of the annuli 34, 24 are 144 and 117 respectively; of the pinion 68 is 34 and of the gear 78 is 79. The pinion 54 has 24 teeth and the pinion 36 has 20 teeth; the pinion 68 runs at −692 rpm and the pinion 54 runs at +818 rpm. The traction distribution is about 55% for the drive gear 66 and about 45% for the adhesion wheels 48. The annulus 34, in this case, runs at 0 rpm, that is, there is no slip between the gears 66 and the wheels 80, 82.

If during traction, the adhesion wheels 80, 82 start to slip because of an impaired wheel-to-rail friction, the annulus 34 starts to rotate. This causes the pinion 36 to rotate the shaft 42 and thus the oil pump 92 of the speed control means 40. The pump 92 then begins to pump oil via the line 98, diverter 100 and valve 94 to the sump 96.

The delivery increases in proportion to the speed per unit of time as such speed increases. The flow control valve 94 is adjusted so that the oil flow passes substantially without loss until the shaft 42 is running at about 60 rpm. At this time, the annulus 34 is running at 7.5 rpm, corresponding to a slip of approximately 3 kilometers per hour or 6%. However, when the shaft 42 tends to run faster than 60 rpm, the oil flow through the valve 94 encounters a resistance leading to a pressure increase in the line 98 and, therefore, a torque is applied to the shaft 42.

Conditions are similar for braking except that the direction of rotation of the shaft 42 and the pump 92 reverses. However, the delivery of the pump 92 continues in the same direction. In this case, the pump 92 may be in the form of a reciprocating pump having spring-loaded valves.

The speed of the shaft 42 can be locked to 0 by a corresponding actuation of the diverter 100; the delivery of the pump 92 ceasing entirely. If the speed control means 40 is to be made very compact, instead of using the oil pump system described, use can be made of a mechanical devicer such as a hydrodynamic brake or a centrifugal brake.

Referring to FIG. 3, wherein like reference characters indicate like parts as above, the gear 60 may be directly connected by way of a hollow hub 102 to a wheel 106 on which a rubber tire 104 is mounted and which is mounted by means of a shaft 108 in a bearing 86. In a similar manner, the gear 78 is connected to an appropriate wheel 112 by way of a shaft 110 which is mounted in a bearing 84. The wheel 112 also carries a rubber tire 104. In addition, the speed control means 114 is embodied by a generator 116 which is coupled to the shaft 42 and which is connected via lines 118, 119 to an accumulator 120. The accumulator 120 is connected to the generator 116 in such a manner so as to receive a voltage surge in response to the shaft 42 reaching a predetermined speed.

In addition, a braking means 122 is associated with the shaft 42 for selectively braking the shaft 42.

As an example of how the drive of FIG. 3 operates, it is assumed that in the previous embodiment that a particular maximum number of revolutions per unit of time of the shaft 42 corresponds to a permissible maximum slip value, in this case, the slip between the wheels 106 and 112. As long as this speed is being undershot, the generator 116 produces a negligible current and there is negligible resistance to the shaft 42. However, when the critical speed is reached, the generator 116 produces the rated voltage. In the event that the critical speed is overshot, a voltage surge is prevented by the generated current being supplied to the accumulator 120 while the speed remains substantially constant. The revolutions of the shaft 42 per unit of time cannot therefore increase and the slip between the wheels 106 and 112 remains substantially constant.

If the shaft 42 of the drive should be completely locked, for example during an off-the-road travel of the vehicle, the braking means 122 is operated so that the shaft 42 is locked in both directions of rotation.

Of course, the drive just described can be so constructed that a particular minimum number of revolutions per unit of time of the shaft 42 corresponds to a permissible minimum slip value. In this event, the generator 116 is replaced by a motor. While the permissible minimum speed of the shaft 42 continues to be overshot, the motor poses negligible resistance to the rotation of the shaft 42. However, when the minimum speed is undershot, the motor operates to produce an opposing torque. The number of revolutions per unit of time remaining constant and the slip being unable to decrease any further.

Figure 4:
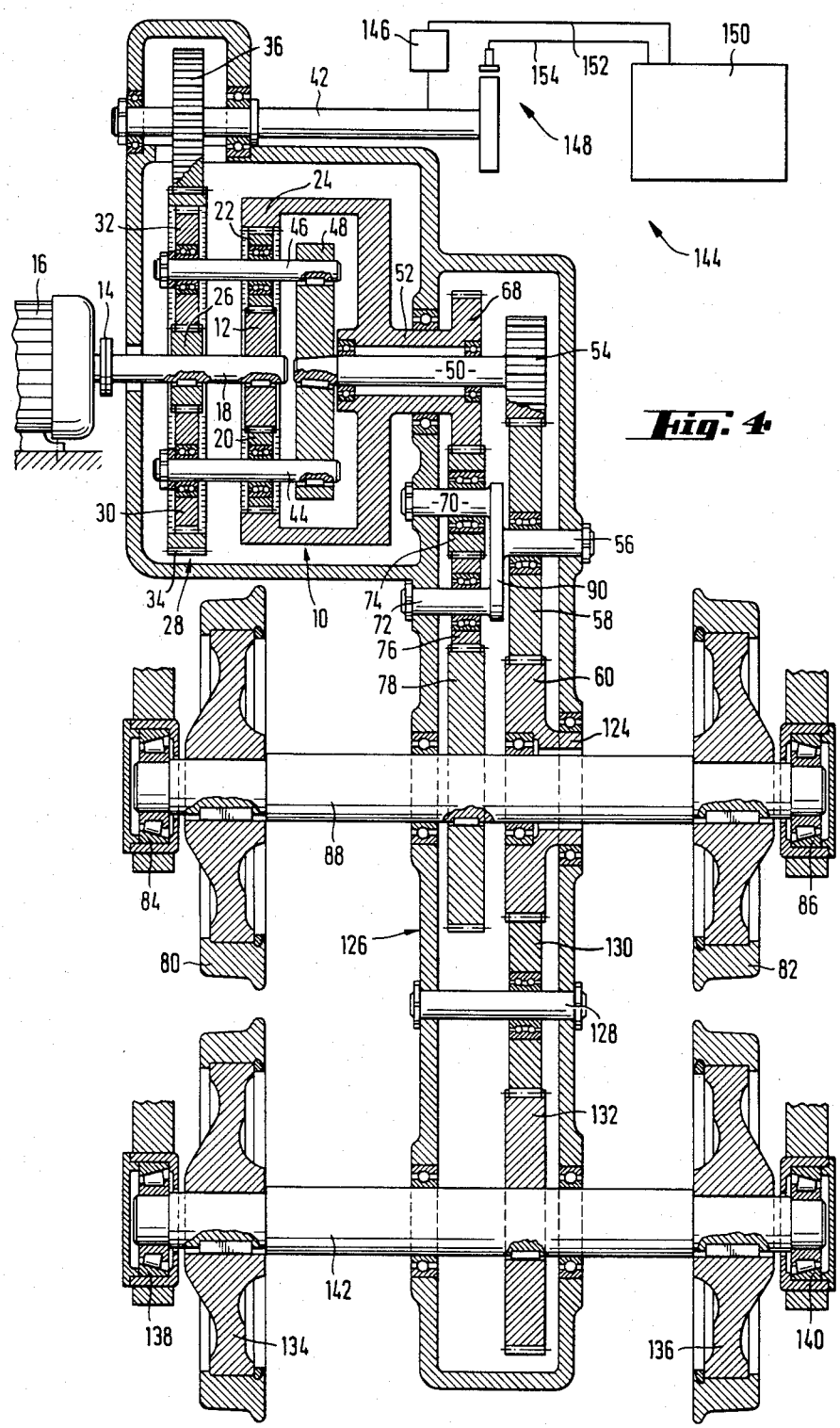
FIG. 4 illustrates a longitudinal sectional view of a further embodiment of a transmission according to the invention for a four wheel running frame of a locomotive.

Referring to FIG. 4, wherein like reference characters indicate like parts as above, the transmission gear 60 may be mounted directly on a hollow hub 124 which is journalled in a casing 126 to cooperate via a pinion 130 which is mounted on a journal 128 with a gear 132 which is connected for co-rotation to a second drive shaft 142. As shown, the drive shaft 142 carries a pair of adhesion wheels 134, 136 and is mounted in suitable bearings 138, 140 in the vehicle frame.

In addition, the shaft 42 is connected to a speed control means 144 which includes a speed sensor 146 for sensing the speed of the shaft 142 and a control facility 150 which is connected to the speed senser 146 via a line 152 and to a braking means 148 via a line 154. In this respect, it is noted that the braking means is in the form of an electric brake.

As an example of how the latter transmission operates, it is again assumed that a particular maximum absolute number of revolutions per unit of time of the shaft 42 corresponds to a particular maximum permitted absolute value of slip between the drive shafts 88 and 142. When this number of revolutions has been reached, the senser 146 emits a responsive signal via the line 152 to the control facility 150. In turn, the control facility 150 sends a signal via the line 154 to actuate the electric brake 148 so that the number of revolutions per unit of time of the shaft 42 remains constant. When the slip decreases again, the brake 148 is released and the slip can adjust itself.

Of note, various values of slip, i.e. corresponding revolutions per unit of time of the shaft 42, can be programmed in the control facility 150 so that optimum slip values can be selected, for instance, in accordance with weather conditions.

Referring to FIG. 5, wherein like reference characters indicate like parts as above, the gear 60 is directly connected via a hollow hub 158 to a conveying roll 160 which is mounted on a shaft 162 for rotation therewith. As indicated, the shaft 162 is mounted in a bearing 86 which is mounted in a frame, for example of a conveyor. The conveyor roll 160 presses material 164, for example a strip or tape or the like of plastics or metal or paper or the like, onto a pressing roll 166 for conveyance. The pressing roll 166 is mounted on a shaft 172 which is journalled in a bearing 170 which is fixed in the conveyor frame and a bearing which is mounted in a casing 168.

The gear 78 is connected via a shaft 174 to a second conveying roll 176. This roll 176 presses a material 178 for conveyance against a pressing roll 180. As indicated, the thickness of the material 178 is different from the thickness of the material 164. In addition, the roll 180 is connected for co-rotation to a shaft 184 which is rotatably mounted in the casing 168 and in a bearing 182 in the conveyor frame.

Of note, the shaft 162 is able to rotate coaxially with the shaft 174 but at different speeds.

A speed control means 186 for the shaft 42 includes a speed senser 146 and a control facility 150 as above. However, instead of using a brake means, an electric machine in the form of a motor-generator unit 188 is connected to the shaft 42 as well as to a signal line 156 from the control facility 150.

As an example of operation, it is assumed that the materials 164, 178 are required to be advanced with a particular tension relationship and that the slip between the rolls 160, 176 is to be maintained in a particular range. Consequently, a minimum and maximum slip corresponds to a minimum and maximum absolute number of revolutions per unit of time of the shaft 42. When the shaft 42 reaches the maximum number of revolutions per unit of time, the detector 146 transmits a corresponding signal to the control facility 150. The control facility 150 then emits a signal via the signal line 156 to the unit 188 so as to change the unit 188 over to a generating mode to prevent any further increase in speed. Conversely, when the number of revolutions per unit of time decreases to a predetermined minimum, the unit changes over to a motor mode. This prevents any further decrease in the speed of the shaft 42 and, therefore, of the slip. Consequently, the slip between the rolls 160 and 176 is free to vary within the permissible limits, which can be adjusted very accurately.

What is claimed is:

1. A transmission comprising
    a power division transmission having a power input shaft, a first branched transmission connected with said input shaft and a second branched transmission connected with said input shaft said branched transmissions characterized in having a constant torque ratio
    a differential transmission connected with each said branched transmission and having a rotatable transmission part for rotation in response to a slip between said branched transmissions;
    a braking means for selectively braking said rotatable transmission part; and
    a speed control means connected solely to said rotatable transmission part for limiting the speed of said part to limit said slip between said branched transmissions, said speed control means including a speed sensor for sensing the speed of said transmission part and emitting a signal in response thereto, and a control facility connected between and to said senser and said braking means for receiving said signal and selectively actuating said braking means in response to said signal.

2. A transmission as set forth in claim 1 wherein said speed control means includes an oil pump for circulating a flow of oil in a closed circuit in response to rotation of said transmission part and a flow control valve in said circuit for limiting the flow of oil in said circuit.

3. A transmission as set forth in claim 1 wherein said speed control means includes a generator coupled to said transmission part and an accumulator connected to said generator to receive a voltage surge therefrom in response to said transmission part reaching a predetermined speed.

4. A transmission as set forth in claim 1 wherein said speed control means is an electrical motor-generator unit capable of selectively operating in a motor mode or a generator mode.

5. A transmission as set forth in claim 4 wherein said speed control means further includes a speed senser for sensing the speed of said transmission part and emitting a signal in response thereto, and a control facility connected between and to said senser and said motor-generator unit for receiving said signal and switching said unit from one of said modes to the other of said modes.

6. A transmission as set forth in claim 1 wherein said speed control means is a hydrodynamic brake.

7. A transmission as set forth in claim 1 wherein said speed control means is a centrifugal brake.

8. A transmission as set forth in claim 1 wherein said power division transmission has a sun gear mounted on said input shaft for rotation therewith, said first branched transmission has an internally toothed annulus about said sun gear and a pair of planetary gears in meshing engagement with said sun gear and said annulus and said second branched transmission has a shaft interconnected with said planetary gears to rotate therewith coaxially of said input shaft.

9. A transmission as set forth in claim 8 wherein said differential transmission includes a second sun gear mounted on said input shaft for rotation therewith, a second internally toothed annulus engaged with said rotatable transmission part, and a second pair of planetary gears in meshing engagement with said second sun gear and said second annulus, said second pair of planetary gears being connected in common with said first pair of planetary gears and said shaft of said second branched transmission.

10. A transmission comprising
    a power division transmission having a power input shaft, a sun gear mounted on said shaft for rotation therewith, a first branched transmission having an internally toothed annulus about said sun gear and a pair of planetary gears in meshing engagement with said sun gear and said annulus and a second branched transmission connected with said input shaft, said second transmission having a shaft interconnected with said planetary gears to rotate therewith coaxially of said input shaft, said branched transmissions characterized in having a constant torque ratio;
    a differential transmission connected with each said branched transmission and having a rotatable transmission part for rotation in response to a slip between said branched transmissions, said differential transmission including a second sun gear mounted on said input shaft for rotation therewith, a second internally toothed annulus engaged with said rotatable transmission part, and a second pair of planetary gears in meshing engagement with said second sun gear and said second annulus, said second gear of planetary gears being connected in common with said first pair of planetary gears and said shaft of said second branched transmission; and
    a speed control means connected solely to said rotatable transmission part for limiting the speed of said part to limit said slip between said branched transmissions.

11. A transmission as set forth in claim 10 wherein said transmission part is a shaft.

12. A transmission as set forth in claim 10 which further comprises a drive shaft having a pair of adhesion wheels thereon connected to said first branched transmission and a drive gear connected to said second branched transmission.

13. A transmission as set forth in claim 10 which further comprises a first drive shaft having a wheel thereon connected to said first branched transmission and a second drive shaft having a wheel thereon connected to said second branched transmission, said second drive shaft being coaxial with said first drive shaft.

14. A transmission as set forth in claim 10 which further comprises a drive shaft having a pair of adhesion wheels thereon connected to said first branched transmission and a second drive shaft having a pair of adhesion wheels thereon connected to said second branched transmission.

15. A transmission comprising
   a power division transmission having a power input shaft, a first branched transmission connected with said input shaft and a second branched transmission connected with said input shaft, said branched transmissions characterized in having a constant torque ratio;
   a differential transmission connected with each said branched transmission and having a rotatable transmission part for rotation in response to a slip between said branched transmissions; and
   a speed control means connected solely to said rotatable transmission part for limiting the speed of said part to limit said slip between said branched transmissions, said speed control means including an oil pump for circulating a flow of oil in a closed circuit in response to rotation of said transmission part and a flow control valve in said circuit for limiting the flow of oil in said circuit.

16. A transmission comprising
   a power division transmission having a power input shaft, a first branched transmission connected with said input shaft and a second branched transmission connected with said input shaft, said branched transmissions characterized in having a constant torque ratio;
   a differential transmission connected with each said branched transmission and having a rotatable transmission part for rotation in response to a slip between said branched transmissions; and
   a speed control means connected solely to said rotatable transmission part for limiting the speed of said part to limit said slip between said branched transmissions, said speed control means includes a generator coupled to said transmission part and an accumulator connected to said generator to receive a voltage surge therefrom in response to said transmission part reaching a predetermined speed.

17. A transmission comprising
   a power division transmission having a power input shaft, a first branched transmission connected with said input shaft and a second branched transmission connected with said input shaft, said branched transmissions characterized in having a constant torque ratio;
   a differential transmission connected with each said branched transmission and having a rotatable transmission part for rotation in response to a slip between said branched transmissions; and
   a speed control means connected solely to said rotatable transmission part for limiting the speed of said part to limit said slip between said branched transmissions, said speed control means being an electrical motor-generator unit capable of selectively operating in a motor mode or a generator mode.

18. A transmission as set forth in claim 17 wherein said speed control means further includes a speed senser for sensing the speed of said transmission part and emitting a signal in response thereto, and a control facility connected between and to said senser and said motor-generator unit for receiving said signal and switching said unit from one of said modes to the other of said modes.

* * * * *

UNITED STATES PATENT AND TRADEMARK OFFICE
CERTIFICATE OF CORRECTION

PATENT NO. : 4,519,272
DATED      : May 28, 1985
INVENTOR(S) : Bruno Meier

It is certified that error appears in the above-identified patent and that said Letters Patent is hereby corrected as shown below:

Column 7, line 26 change "shaft said" to -shaft, said-

Column 8, line 44 change "second gear" to -second pair-

Signed and Sealed this

First Day of October 1985

[SEAL]

Attest:

DONALD J. QUIGG

Attesting Officer

Commissioner of Patents and
Trademarks—Designate